(No Model.)

M. H. WALSH.
CARPENTER'S RULE.

No. 388,605. Patented Aug. 28, 1888.

WITNESSES:
Fred G. Dieterich,
Geo. H. Evans.

INVENTOR,
M. H. Walsh
BY Munn & Co.
ATTORNEY.

UNITED STATES PATENT OFFICE.

MICHAEL H. WALSH, OF BOSTON, MASSACHUSETTS.

CARPENTER'S RULE.

SPECIFICATION forming part of Letters Patent No. 388,605, dated August 28, 1888.

Application filed March 7, 1888. Serial No. 266,436. (No model.)

*To all whom it may concern:*

Be it known that I, MICHAEL H. WALSH, of Boston, in the county of Suffolk and State of Massachusetts, have invented a new and Improved Carpenter's Rule, of which the following is a full, clear, and exact description.

This invention relates to an improvement in carpenter's rules, and has for its object to provide a carpenter's rule so constructed that it may be used as a bevel or a square as well as a rule.

The invention will be set forth in the following description, and pointed out in the claims.

Reference is to be had to the accompanying drawings, forming a part of this specification, in which similar figures of reference indicate corresponding parts in all the views.

Figure 1:
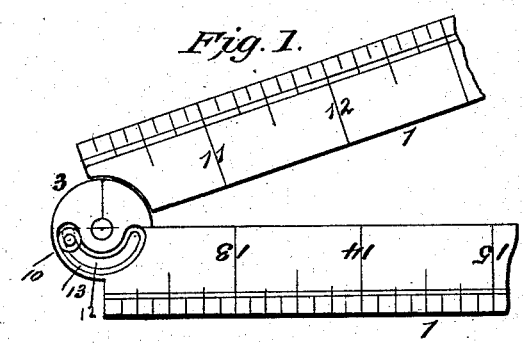
Figure 2:
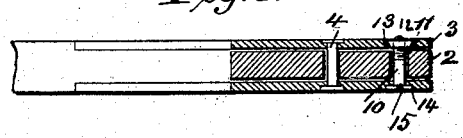
Figure 3:
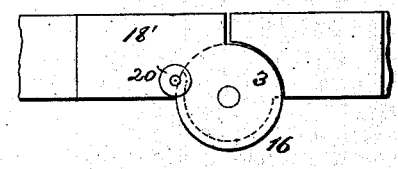
Figure 4:
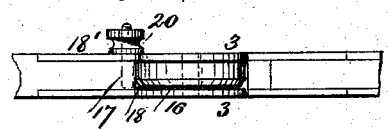
Figure 5:

Figure 1 is a plan view of a carpenter's pocket-rule with my improvements applied. Fig. 2 is a horizontal section of the same at the joint. Fig. 3 is a plan of the joint having a modified form of adjustment. Fig. 4 is a side view of Fig. 3, and Fig. 5 is a detail of the clamping-pin shown in Figs. 2 and 3.

2 and 3 represent the inner and outer projections or knuckles of the rule-joint pivoted together by means of a pin, 4. 10 is a screw or pin, which passes through one of the projections, 3, and the projection 2, and has a nut, 11, on one end, countersunk and resting in the slot 12 on the other projection, 3, having beveled sides 13. The head 14 of the screw or pin 10 is formed with a notch, 15, for a screw-driver.

In operation the legs 1 are adjusted to the proper position and the screw or pin 10 is then tightened by means of a screw-driver, thereby drawing the projections together and clamping them in immovable position. In this form there will be no lateral projections on the joint.

If desired, the surface of the projection may have a graduated scale conforming to the curved slot, whereby the degree of adjustment may be determined.

In the modification in Figs. 3, 4, and 5 the curved slot is omitted and the projection 2 is formed with a beveled edge, 16. A pin, 17, with a beveled projection, 18, at one end is located in the inner end of one of the legs of the rule 1, the projection 18 being located contiguous to the beveled edge 16. The pin 17 projects through the arm 18' of one of the circular projections 3, and has a screw-threaded end, 19, on which is mounted a thumb-nut, 20. By screwing up the nut 20, the projections 2, 3 3, and 18 are clamped together and the rule is held firmly in adjusted position.

Having thus described my invention, I claim as new and desire to secure by Letters Patent—

1. A carpenter's rule having a joint consisting of a circular projection on one leg of the rule centrally pivoted between the two projections on the other leg of the rule, one of the projections having a beveled edge concentric with the pivotal point of the joint, and an adjusting-pin transverse to the projections and provided with a beveled clamping-surface engaging said beveled edge, substantially as described.

2. A carpenter's rule having a joint consisting of circular projection 2, having a beveled edge, 16, centrally pivoted between circular projections 3, and the clamping-pin 17, having beveled projection 18, engaging beveled edge 16 and screw-threaded end 19 with thumb-nut 20, substantially as described.

MICHAEL H. WALSH.

Witnesses:
ANDREW GATELEY,
DANIEL TURNER.